United States Patent Office 3,014,522
Patented Dec. 26, 1961

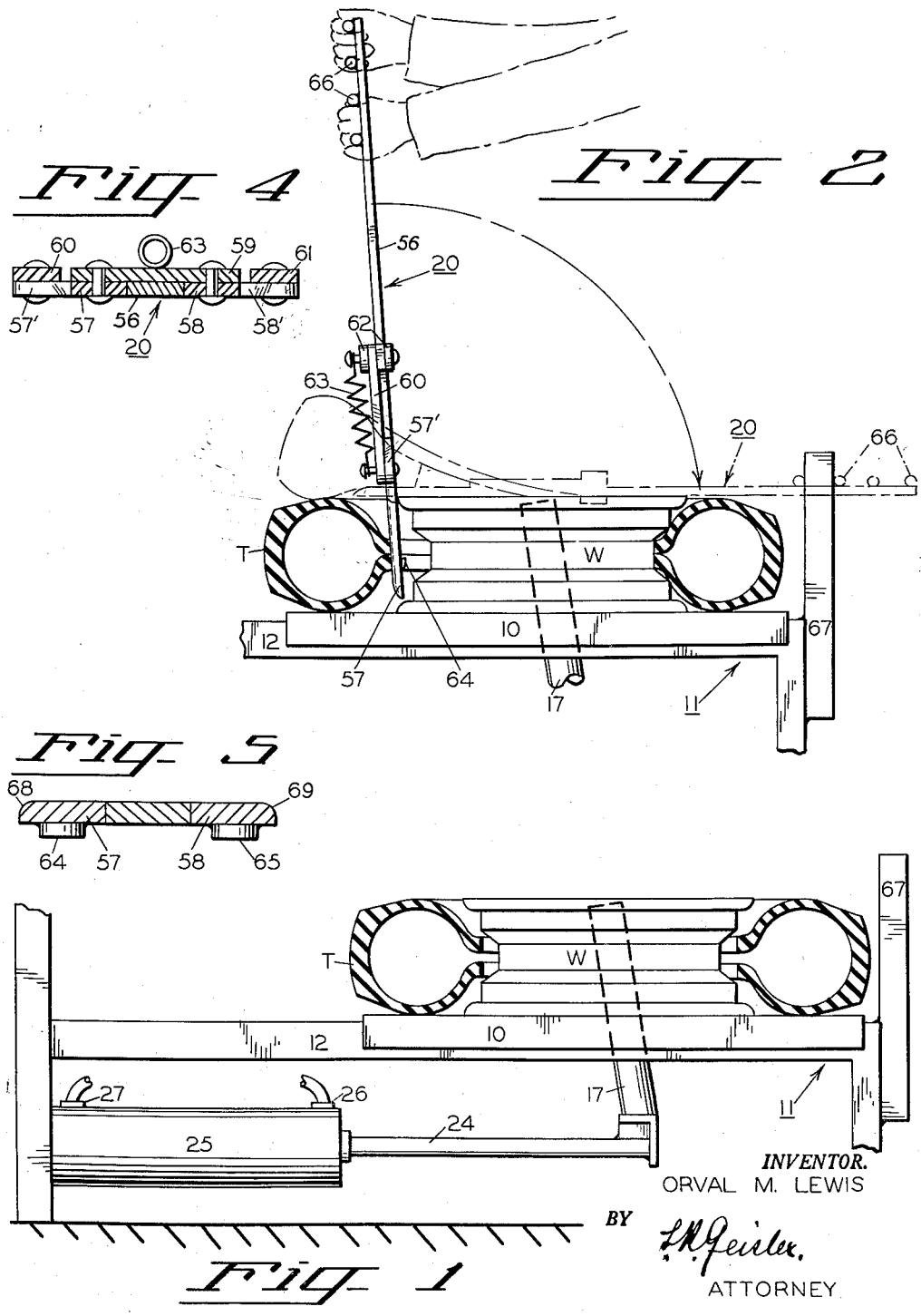

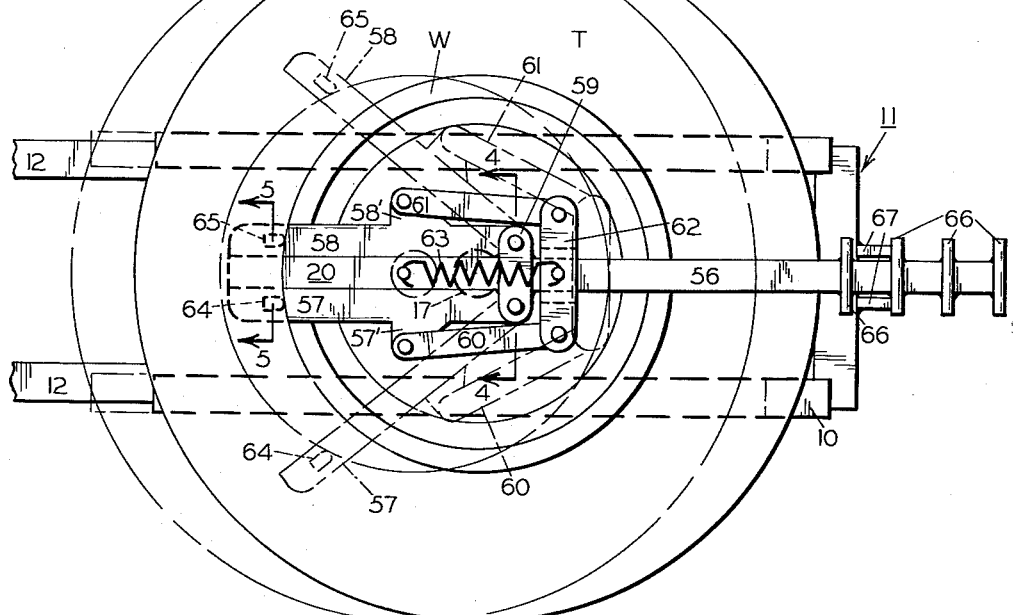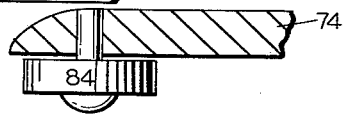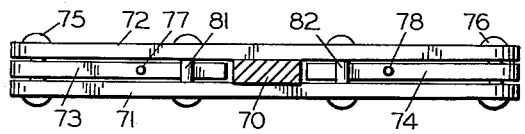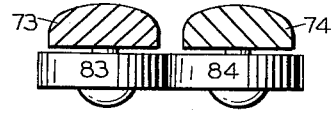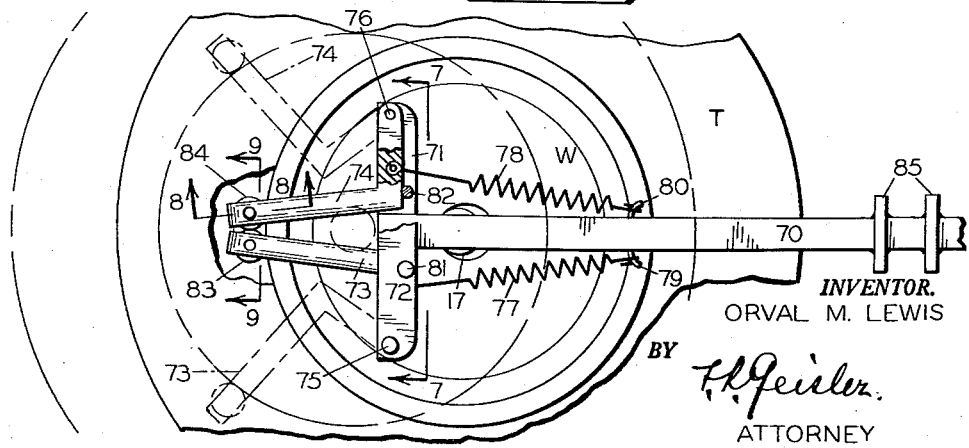

3,014,522
TIRE REMOVING ASSEMBLY
Orval M. Lewis, 1118 Main St., Sweet Home, Oreg.
Filed Mar. 25, 1960, Ser. No. 17,683
1 Claim. (Cl. 157—1.1)

This invention relates to the removal of a loosened tire from a vehicle wheel, and, more specifically, relates to means for lifting the beads of a tire from a vehicle wheel after the tire has been collapsed on the wheel and at least a substantial portion of the tire beads have been loosened from the respective rims on the wheel.

This application is divided from and is a continuation-in-part of my application Serial No. 748,733 filed under date of July 15, 1958, which became Patent No. 2,933,128, April 19, 1960, and entitled "Device for Collapsing and Removing a Vehicle Wheel Tire," to which reference should be made.

The object of the invention described in this present application is to provide an assembly comprising a simple practical tool in combination with a power-operated, movable wheel-supporting carriage, for removing a loosened tire from a vehicle wheel.

A related object is to provide such an assembly comprising a power-operated movable carriage and tire bead lifting tool which will enable a loosened tire on the vehicle wheel to be lifted from the wheel and thus entirely removed from the wheel very easily and quickly with only a minimum of effort on the part of the operator and without any possibility of injury to the tire during such removal.

The manner in which these objects are accomplished and the manner in which the power-operated carriage and bead lifting tool cooperate in the removal of a tire from a vehicle wheel will be readily understood from the following brief description.

In this description reference is made to the accompanying drawings wherein:

FIG. 1 is a fragmentary side elevation showing the movable, power-operated carriage for supporting and moving the wheel during the removal of the loosened tire from the wheel;

FIG. 2 is an elevation illustrating in full lines the manual insertion of the bead lifting tool down between the loosened tire beads and the wheel rim as the first step in the tire removing operation, and showing in broken lines the second position in which the lifting tool is then manually placed;

FIG. 3 is a plan view of the wheel, tire and bead lifting tool, drawn to a larger scale, the full lines illustrating the tool in the second position shown in FIG. 2 and the broken lines illustrating the subsequent position into which the tool is automatically moved as the carriage moves the wheel and the tire towards the left;

FIG. 4 is a section through the lifting tool on the lines 4—4 of FIG. 3, drawn to a larger scale;

FIG. 5 is a section on line 5—5 of FIG. 3 drawn to a larger scale;

FIG. 6 is a plan view similar to FIG. 3 showing a modification in the bead lifting tool;

FIG. 7 is a transverse section of the modified tool of FIG. 6 taken on line 7—7 of FIG. 6 but drawn to a larger scale;

FIG. 8 is a fragmentary section on line 8—8 of FIG. 6 drawn to still larger scale; and FIG. 9 is a section on line 9—9 of FIG. 6 drawn to the same scale as FIG. 8.

Referring first to FIG. 1, a carriage 10, arranged for supporting a vehicle wheel W from which the tire T is to be removed, is slidably mounted on a frame assembly indicated as a whole by the reference character 11. The frame assembly 11 includes a pair of parallel oppositely disposed channel members, one of which is shown at 12 in FIG. 1, and the carriage is provided with supporting rollers (not shown) which run in these channel members. A center post 17 is rigidly secured to the carriage 10 and extends above and below the carriage. This post extends above the carriage 10 a distance approximately equal to the thickness of an average vehicle wheel and extends through the hub of the vehicle wheel when the wheel is set in place on the carriage. Preferably this post is inclined slightly towards the left, as shown in FIG. 1, so that when movement of the carriage and post forces the wheel and tire to move toward the left, as later explained, the inclination of the post 17 will overcome any tendency of the wheel hub to slide upwardly on the post and become disengaged therefrom.

The lower end of the post 17 is connected to the outer end of the piston rod 24 of a piston located within a compressed air cylinder 25. Delivery of air into the cylinder 25 through the port 26 at the right hand end of the cylinder (as viewed in FIG. 1) will cause movement of the piston, piston rod 24, post 17, carriage 10, and the wheel, and tire on the carriage, towards the left, as viewed in FIG. 1. Delivery of air into cylinder 25 through the port 27 at the left hand end of the cylinder will return the carriage 10 to the normal starting position shown in FIG. 1. The delivery of compressed air into either one of these ports and the discharge of air from the other is controlled by suitable valve means (not shown) through which the cylinder is connected with a suitable source of air under pressure (not shown).

A pair of vertical bars 67 (FIGS. 1 and 3), spaced a few inches apart, are rigidly mounted on the right hand end of the main frame 11 and are centrally positioned with respect to the sides of the carriage 10. The purpose of these bars 67 is to engage and hold the main bar of the tire removing tool as presently explained, when the carriage 10 moves the wheel and tire towards the left.

The tire removing tool (FIGS. 2, 3 and 4), indicated as a whole by the reference character 20, consists of a flat central main bar 56 having a pair of flat arms 57 and 58 located in the same plane with the main bar 56 and pivotally mounted on a cross bar 59 which in turn is rigidly secured to the main bar 56. Links 60 and 61 connect lateral extensions 57′ and 58′ of the arms 57 and 58 respectively with a cross head 62 which is slidably mounted on the main bar 56. A spring 63 pulls the slidable cross head 62 towards the stationary cross bar 59 and thus pulls the arms 57 and 58 normally against the edges of the main bar 56. The arms 57 and 58 have lugs 64 and 65 on the undersides or bottom faces for engaging the top rim of the wheel. A series of spaced cross bars 66 are rigidly mounted on the opposite end of the main bar 56 for a purpose presently apparent.

After the wheel has been placed on the carriage 10 and the beads of the tire have been loosened from the adjacent rim portions of the wheel by the means and in the manner described in the previously mentioned application Serial No. 748,733, and the carriage 10 with the wheel thereon has been returned to the starting position on the frame assembly 11, and thus in the position shown in FIGS. 1 and 2, the tool 20 is manually inserted vertically down between the loosened tire beads and the wheel at the location opposite from the pair of vertical bars 67, this substantially vertical position of the tool 20 being illustrated in full lines in FIG. 2. Then the tool 20 is brought down into horizontal position on top of the wheel and thus is in the position shown in broken lines in FIG. 2, which position is also shown in full lines in FIG. 3. In bringing the tool 20 down into horizontal position the right hand end of the main bar 56 (as viewed in FIGS. 2 and 3) is brought down between the pair of vertical bars 67, and one of the cross bars 66 on the main bar 56 will then be so positioned to be engaged by the right side edges of the bars 67.

With the tool 20 in this position the carriage 10, and with it the wheel W and tire T, are caused to move to the left by the delivery of compressed air into the right end of cylinder 25 through the port 26 (FIG. 1). However, since the main bar 56 is held against movement to the left by the engagement of one of the cross bars 66 with the pair of vertical bars 67, the movement of the wheel W to the left will cause the upper rim of the wheel to engage the lugs 64 and 65 on the underside of the arms 57 and 58. Thereupon continued movement of the wheel to the left will force the arms 57 and 58 to move in opposite directions around the wheel rim. In moving on the wheel rim in this manner the arms 57 and 58 lift the tire up above the top rim of the wheel until the tire becomes freed from the wheel. The upper outer edges of the arms 57 and 58 are rounded, as indicated at 68 and 69 in FIG. 5, so that the engagement of the arms 57 and 58 with the tire beads, in lifting the tire from the wheel occurs without any injury to the tire.

In the modification of the tire lifting tool shown in FIGS. 6, 7, 8 and 9, the main bar 70 (FIG. 6) is shorter than the main bar 56 of the tool previously described and this main bar 70 terminates in a cross head composed of a pair of parallel and identical cross bars 71 and 72 rigidly secured to opposite faces of the main bar 70 respectively. A pair of L-shaped rim-engaging arms 73 and 74 are pivotally mounted on the pivot pins 75 and 76 respectively, extending through the respective ends of the cross bars 71 and 72 forming the cross head. A pair of coil spring 77 and 78, having one end secured to the arms 73 and 74 respectively at the approximate location shown in FIG. 6, have their other ends secured to fixed pins 79 and 80 respectively on the sides of the main bar 70. These coil springs, which are always under tension, hold up the arms 73 and 74 normally in the full line position shown in FIG. 6, in which position the side branches of the arms rest against the stops 81 and 82 respectively in the cross head and the outer or forward tip ends of the arms will rest close together.

On the undersides of the forward ends of the arms 73 and 74 the rollers 83 and 84 are mounted respectively for engaging the top rim of the wheel. On the opposite end of the main bar 70 from the arms 73 and 74 short spaced cross bars 85, similar to the cross bars 66 in FIG. 3, are mounted and serve the same purpose as the cross bars 66 of the tool previously described.

This modified form of the tire lifting tool is employed in the same manner as the tool of FIGS. 2 and 3. Thus with the tool at first and substantially vertical position, the ends of the arms 73 and 74 are inserted down between the loosened tire beads and the wheel. Then the tool is brought down into horizontal position on top of the wheel and the rear end of the main bar 70 is brought down between the pair of vertical bars 67 (FIGS. 1 and 3) with one of the rear cross bars 85 engaging these vertical bars. Then, as the carriage 10, and with it the wheel and tire are moved to the left (as viewed in FIG. 1), since the main bar 70 is held by the stationary vertical bars 67, the arms 73 and 74, with their rollers 83 and 84 bearing against the top rim of the wheel, will be forced to move in opposite directions around the wheel rim, lifting the tire above the upper wheel rim as they move.

I claim:

An assembly for removing a loosened tire from a vehicle wheel including a main frame, a wheel-supporting carriage mounted on said main frame for movement in a substantially horizontal direction, wheel engaging means on said carriage to insure horizontal movement of said wheel with said carriage but resist upward movement thereof wtih respect to said carriage during movement of said carriage, a tire bead lifting tool, a main bar in said tool, a pair of arms located on opposite sides of said main bar respectively in the same plane as said main bar, pivotal mounting support means connecting the inner ends of said arms with said main bar on opposite sides of said main bar respectively and enabling the outer free ends of said arms to swing in arcs in said plane on opposite sides with respect to said main bar, spring means normally holding said free ends of said arms in proximity to each other with said free ends extending forwardly with respect to said main bar, said free ends of said arms adapted to be inserted down between the beads of the loosened tire and the wheel rim when said main bar is in upright position and then to cause the engaged portion of the tire to be lifted above the wheel rim when said main bar and said arms are brought down into horizontal position on the top of the wheel, a rim-engaging element located on the underside of that portion of said free end of each arm which is inserted down between the tire and the wheel, inter-engaging means on said main bar and on said main frame for holding said main bar against movement with said carriage and wheel when said main bar is in a horizontal position on top of the wheel, and means for moving said carriage and therewith said wheel in a direction away from said inter-engaging means and against said rim-engaging elements, whereby such movement of said carriage with said inter-engaging means in operation will cause said free ends of said arms to be moved in opposite directions on the wheel rim for lifting the tire from the wheel.

References Cited in the file of this patent

UNITED STATES PATENTS

| | | |
|---|---|---|
| 2,189,683 | Schultz | Feb. 6, 1940 |
| 2,665,747 | Harrison | Jan. 12, 1954 |
| 2,816,604 | Greenley et al. | Dec. 17, 1957 |
| 2,903,050 | Lewis | Sept. 8, 1959 |